United States Patent [19]

Urvoy

[11] Patent Number: 5,378,204
[45] Date of Patent: Jan. 3, 1995

[54] HYDROSTATIC APPARATUS FOR TENSIONING A TRACK ON A VEHICLE

[75] Inventor: Emile Urvoy, Limours, France
[73] Assignee: Giat Industries, Versailles, France
[21] Appl. No.: 224,248
[22] Filed: Apr. 7, 1994

[30] Foreign Application Priority Data

Apr. 16, 1993 [FR] France ................. 93 04511

[51] Int. Cl.6 ............................. F16H 7/08
[52] U.S. Cl. ........................ 474/110; 474/135
[58] Field of Search ............ 474/101, 109–111, 474/113–117, 133–138

[56] References Cited

U.S. PATENT DOCUMENTS 3,463,559  8/1969  Gehrke .................. 474/110 X
3,901,563  8/1975  Day ....................... 474/110 X
5,334,106  8/1994  Purcell .................. 474/110

FOREIGN PATENT DOCUMENTS 2227167  11/1974  France .
1580585  8/1970  Germany .

Primary Examiner—Michael Powell Buiz
Attorney, Agent, or Firm—Bell, Seltzer, Park & Gibson

[57] ABSTRACT

Hydrostatic apparatus for tensioning a track on a vehicle, in particular a tank, in which apparatus the actuator of the return pulley is fed with hydraulic liquid under pressure via an actuator associated with a pressure accumulator and controlled as a function of the acceleration torque or the braking torque applied by a sprocket wheel to the track.

9 Claims, 3 Drawing Sheets

HYDROSTATIC APPARATUS FOR TENSIONING A TRACK ON A VEHICLE

The invention relates to hydrostatic apparatus for tensioning a track on a vehicle, in particular on an armored vehicle such as a tank.

BACKGROUND OF THE INVENTION

On such vehicles, each track is guided firstly over ground wheels, secondly over a drive member referred to as a sprocket wheel which is generally situated at the rear end of the vehicle and above the ground wheels, and thirdly over a return pulley which is generally situated at the front end of the vehicle and at the same height as the sprocket wheel.

The ground wheels support the chassis of the vehicle via a suspension system whose up-and-down motion causes the height above ground of the sprocket wheel and of the return pulley to vary. Such variations in height give rise to variations in track tension, thereby giving rise to slack in certain portions of the tracks. The braking forces and the acceleration forces that are applied to the tracks via the sprocket wheels also give rise to slack in certain portions of the tracks.

Naturally, a certain amount of pre-stress or initial tension may be given to the tracks in an attempt to prevent, at least in part, slack from occurring in certain portions of the tracks. For that purpose, the return pulley may be associated with a hydraulic actuator for displacing the pulley, the actuator being fed from a source of liquid under pressure. The tension of the track that runs over the return pulley is adjusted by adjusting the pressure in the actuator.

Unfortunately, high initial track tension gives rise to greater track fatigue and to greater track wear when the vehicle is in motion, thereby putting a limit on the maximum value that can be given to the initial tension. Furthermore, when forces that are much greater than the initial tension are transmitted to the tracks via the drive system of the vehicle, such forces pass through the taut lengths of the tracks, thereby compressing the suspension of the vehicle and giving rise to slack in the opposite lengths of the tracks.

The following two drawbacks result from slack occurring in certain portions of the tracks when the vehicle is in motion:

the track might ride over the drive sprocket wheel during braking, the slack occurring in the rear length of the track then tending to ride up over the teeth of the sprocket wheel, thereby causing a shoe of the track to skip a sprocket, resulting in very jerky transmission; and the track might come off on soft and uneven terrain, where earth might exert forces laterally on the slack lengths of the tracks, which forces, together with the absence of tension, might cause the tracks to become disengaged from their side guides, thereby causing them to come off.

To mitigate those drawbacks, proposals have already been made to associate the return pulley with the first ground wheel (or the wheel that is closest to the pulley) via a mechanical or hydromechanical coupling system which is designed to take up the slack in the track by moving the return pulley forwards when the front wheel rises relative to the chassis of the vehicle, so as to keep the track under tension. Such a system offers the advantage of being passive, and of not consuming any energy, but it only solves part of the problem, by dealing with slack in the front length of the track only. Furthermore, that system can result in dynamic forces that prevent the suspension of the vehicle from operating. To keep the track under tension, the return pulley must be moved forwards very quickly when the front ground wheel rises suddenly (when the vehicle runs over an obstacle), and this means that the return pulley and the front ground wheel must be dynamically united, and that extremely large forces may be caused in the coupling system between the return pulley and the front wheel.

Proposals have also been made to servo-control the position of the return pulley to the state of the suspension of the vehicle, by means of a hydraulic actuator for displacing the return pulley, and of a servo-control circuit comprising a computer and geometrical-deformation sensors mounted on the suspension, thereby constituting an "active" system. However, since the hydraulic actuator must be dimensioned so as to withstand the maximum braking force that can be applied to the track, the power consumed by such an active system is very high, e.g. about several hundred kilowatts per track.

OBJECTS AND SUMMARY OF THE INVENTION

An object of the invention is to provide apparatus for tensioning a track on a vehicle of the above-mentioned type, the apparatus being of the passive type, consuming very little energy, and enabling a substantially constant track tension to be maintained under almost all circumstances.

To this end, the present invention provides hydrostatic apparatus for tensioning a track on a vehicle, in particular an armored vehicle such as a tank, on which the track is guided over ground wheels, over a drive member such as a sprocket wheel, and over a return pulley whose spindle is associated with a pulley-displacing hydraulic actuator enabling the tension of the track to be adjusted, said apparatus including feed means for feeding the actuator of the return pulley with hydraulic liquid at a pressure which corresponds to a minimum desired value for the tension of the track when the sprocket wheel transmits acceleration torque to the track, and which is increased by an amount that is a function of the torque transmitted by the sprocket wheel to the track when the torque is braking torque, the feed means comprising firstly static pressure-maintaining means for maintaining a minimum pressure in the actuator of the return pulley, and secondly a second hydraulic actuator controlled by mechanical means for transmitting the torque applied by the sprocket wheel to the track.

The apparatus of the invention therefore makes it possible firstly to apply a thrust force to the return pulley, which force is adapted to the conditions under which the vehicle is travelling, and secondly to maintain tension in the track that is not less than a desired minimum value.

According to another characteristic of the invention, the sprocket wheel is connected to a drive shaft via a planetary-type differential gear train in which a member that is normally prevented from rotating, such as the planet carrier, is mounted so as to be free to rotate about the axis of the sprocket wheel and is connected via a linkage to the piston of the second hydraulic actuator so as to transmit a force thereto whose direction and amplitude are functions of the direction and amplitude of the torque applied by the sprocket wheel to the track.

The control means for controlling the second hydraulic actuator offer the advantage of being simple and particularly reliable, and of using equipment that is already provided in the drive transmission of the vehicle.

According to another characteristic of the invention, the pressure-maintaining means comprise a pressure accumulator connected to the actuator of the return pulley via a bistable valve which is connected in parallel with the second actuator, and which is controlled by the displacement of the piston in the second actuator.

Advantageously, the apparatus further includes a control circuit for controlling the bistable valve so as to allow said bistable valve to change state only when the piston of the second actuator is in a predetermined middle portion of its stroke.

In this way, it is possible to avoid certain critical situations, in which the second hydraulic actuator would have no effect because of its piston being blocked at the end of its stroke.

According to another characteristic of the invention, the axles of the front and rear end ground wheels are connected to the chassis of the vehicle via single-acting hydraulic actuators fed via a second hydraulic actuator, the single-acting actuator of the end wheel that is situated in the vicinity of the return pulley and the actuator of said return pulley being fed via the same chamber of the second actuator, whereas the single-acting actuator of the end wheel that is situated in the vicinity of the sprocket wheel is fed via the other chamber of the second actuator.

The hydrostatic connections established in this way between the return pulley and the front wheel, and between the return pulley and the rear wheel, offer the advantage of making it possible to compensate for the unloading effects on the front wheel and on the rear wheel respectively during braking and acceleration, which effects respectively further accentuate the nose-dive and the nose-lift of the vehicle.

Advantageously, the apparatus further includes pressure-adjusting means for setting the pressure to a value corresponding to the minimum desired tension for the track: damping or braking means for damping or braking the backward stroke of the return pulley, which means are provided, for example, in the outlet pipe of the actuator of the pulley; inversion means for inverting the connection between the actuator of the return pulley and the second actuator; and pressure surge absorption means for absorbing a wide dynamic range of pressures, which means comprise, for example, pressure accumulators mounted on the outlets of the second actuator.

BRIEF DESCRIPTION OF THE DRAWINGS

The invention will be better understood and other characteristics, details and advantages of the invention will appear more clearly on reading the following description given by way of example and with reference to the accompanying drawings, in which.

MORE DETAILED DESCRIPTION

Figure 1:
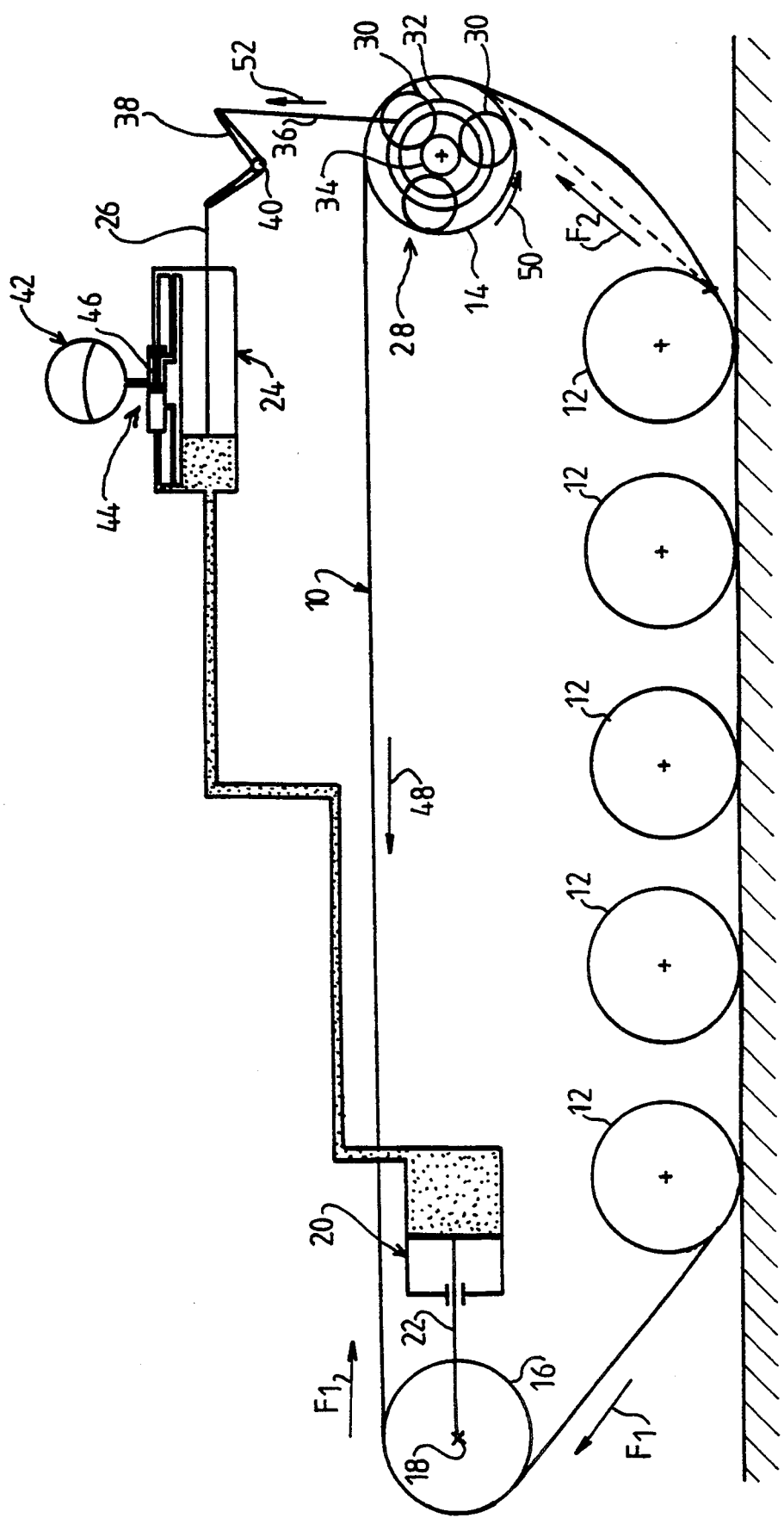
FIG. 1 is a diagrammatic view of apparatus of the invention as provided on a tracked vehicle, such as a tank.

FIG. 1 is a highly diagrammatic side view of a portion of a vehicle such as a tank including two tracks 10, each of which is guided over ground wheels 12, over a drive sprocket wheel 14 situated at the rear of the vehicle and above the ground, and over a return pulley 16 situated at the front of the vehicle and substantially at the same level as the sprocket wheel 14.

The pulley 16 can be displaced in translation parallel to the longitudinal axis of the vehicle by means of a single-acting hydraulic actuator 20 which has a piston rod 22 connected to the spindle 18 of the pulley 16, and which is fed with liquid under pressure via a double-acting hydraulic actuator 24 which is part of the apparatus of the invention.

The piston rod 26 of the actuator 24 is displaced via torque transmission means which transmit the torque applied by the sprocket wheel to the track, so that it is possible to increase the thrust on the return pulley during braking, and to maintain a minimum thrust on the pulley during acceleration. For this purpose, the piston rod 26 is connected to an element of a planetary-type differential gear train mounted between the sprocket wheel 14 and the outlet shaft of a drive member such as the gear box of the vehicle.

In the example shown, the sprocket wheel 14 forms the large ring of the differential gear train 28 which comprises planet wheels 30 carried by a small ring 32 and meshing firstly with inside teeth provided on the large ring and secondly with a sun pinion 34, the sun pinion 34 being rotated by an outlet shaft of the gear box.

In such a differential gear train, the small ring 32 carrying the planet wheels 30 is prevented from rotating. In the invention, the small ring 32 is mounted so that it is free to rotate about the axis of the sprocket wheel, and it is connected to the piston rod 26 of the actuator 24 via a linkage comprising a connecting rod 36 and a crank lever 38 rotatably mounted about a transverse axis 40 that is parallel to the axis about which the sprocket wheel rotates.

In addition, a pressure accumulator 42, shown diagrammatically in the form of a sphere and a membrane, is associated with the actuator 20 of the return pulley and with actuator 24 via a bistable valve 44 which is mounted in parallel with the actuator 24 and which has its outlets connected to the ends of the cylinder of actuator 24. As shown diagrammatically, the bistable valve 44 includes a piston 46 that can be displaced between two opposite end positions by means of the pressure developed inside the actuator 24 so as to put the pressure accumulator 42 in communication with one or other of the chambers of the actuator 24. More precisely, when the piston of the actuator 24 is displaced towards the left of the drawing, and when the pressure increases in the left chamber of the actuator, the small piston 46 of the valve 44 is brought to its right position as shown in drawing, so as to put the accumulator 42 in communication with the right chamber of the actuator 24, and so as to isolate the accumulator from the left chamber thereof. Conversely, when the piston of the actuator is displaced towards the right, and when the pressure increases in the right chamber, the small piston 46 of the valve 44 is brought to its left end position, so as to put the accumulator 42 in communication with the left chamber of the actuator 24, and so as to isolate the accumulator from the right chamber.

The pressure in the accumulator 42 is set to a value which corresponds to a minimum desired tension for the track 10, that pressure being applied to the piston of the actuator 20 of the return pulley and exerting a forward thrust force on the pulley, resulting in tension being applied to the track.

The chassis and the body of the vehicle are carried conventionally by the ground wheels 12 via hydraulic or hydropneumatic suspension means which are not shown in the drawing.

As a result of the presence of the suspension, when the vehicle moves down on its suspension, the height above ground of the sprocket wheel 14 and/or of the return pulley 16 decreases, thereby tending to leave slack in certain portions of the tracks. In the same way, a wheel 12 running over an obstacle on the ground causes the wheel to rise, thereby possibly leaving slack in one of the lengths of the track. Likewise, acceleration forces or braking forces exerted on the track via the sprocket wheel 14 unload the front wheel or the rear wheel and give rise to slack in the front length or the rear length of the track.

A description follows of how the apparatus of the invention operates so as to keep track tension constant or not less than a predetermined value, in almost all possible situations.

It is assumed that the vehicle is moving forwards, with the track 10 being driven in the direction indicated by arrow 48 by the sprocket wheel 14 which is rotating counter-clockwise in the drawing, as indicated by arrow 50, the outlet shaft of the gear box and the sun pinion 34 rotating in the opposite direction, i.e. clockwise.

When the sprocket wheel 14 transmits braking torque to the track 10, either to slow down the vehicle, or to turn the vehicle towards that side on which the braked track is situated, a relatively large braking force F1 occurs in the track 10 on either side of the return pulley 16, the braking force F1 tightening both the top length of the track, i.e. the upper length between the sprocket wheel 14 and the return pulley 16, and also the leading or front length of the track between the return pulley 16 and the front ground wheel 12. The braking force exerted on the track 10 tends to pull the return pulley 16 backwards and to raise the front wheel 12 by compressing the suspension means associated therewith, with slack being left in the trailing or rear length of the track between the sprocket wheel 14 and the rear wheel 12.

The apparatus of the invention makes it possible to resist these two phenomena in the following way: when the sprocket wheel 14 applies braking torque to the track 10, the small ring 32 of the differential gear train tends to rotate counter-clockwise as shown in the drawing of FIG. 1, thereby urging the connecting rod 36 in the direction indicated by arrow 52, rotating the crank lever 38 counter-clockwise about the axis 40, and moving the piston of actuator 24 leftwards. This leftward movement of the piston causes an increase in pressure in the hydraulic circuit connecting the left chamber of actuator 24 to the chamber of the actuator 20 of the return pulley, the increase in pressure resisting the rearward displacement of the pulley 16, and being a direct function of the braking torque applied to the track 10 by the sprocket wheel 14. Simultaneously, because of the increase in pressure in the left chamber of actuator 24, the small piston 46 of the valve 44 is brought to its right end position so as to isolate the accumulator 42 from the left chamber of actuator 24, and so as to put the accumulator in communication with the right chamber thereof. The pressure of the accumulator 42 is thus added to the force exerted on the piston of actuator 24 by the small ring 32 of the differential gear train of the sprocket wheel. In this way, the greater the braking force exerted on the track by the sprocket wheel, the greater the force that tends to resist the rearward displacement of the pulley 16, whereby it is possible to maintain an overall minimum tension in the track, and to avoid slack in the trailing or rear length thereof.

Conversely, when the sprocket wheel 14 transmits acceleration torque to the track 10, the trailing or rear length of the track between the rear wheel 12 and the sprocket wheel 14 becomes taut and a relatively large force occurs in said rear length, this force being represented in the drawing by arrow F2. This force tends to raise the rear wheel 12 by compressing the suspension means thereof, and to cause slack to occur in the front length of the track. The small ring 32 of the differential gear train is rotated clockwise as shown in the drawing, and moves the piston of actuator 24 rightwards. This causes the small piston 46 of the valve 44 to be moved leftwards, thereby isolating the accumulator 42 from the right chamber of actuator 24 and connecting said accumulator to the left chamber thereof. The pressure in the accumulator 42 then acts on the piston of actuator 20 so as to push the return pulley 16 forwards and so as to tighten the front length of the track 10.

The pressure in the accumulator 42 is determined so as to maintain a desired minimum tension in the track. For a heavy tank, this tension may be of the order of several tons, the pressure in the accumulator 42 then being about twenty bars.

Figure 2:
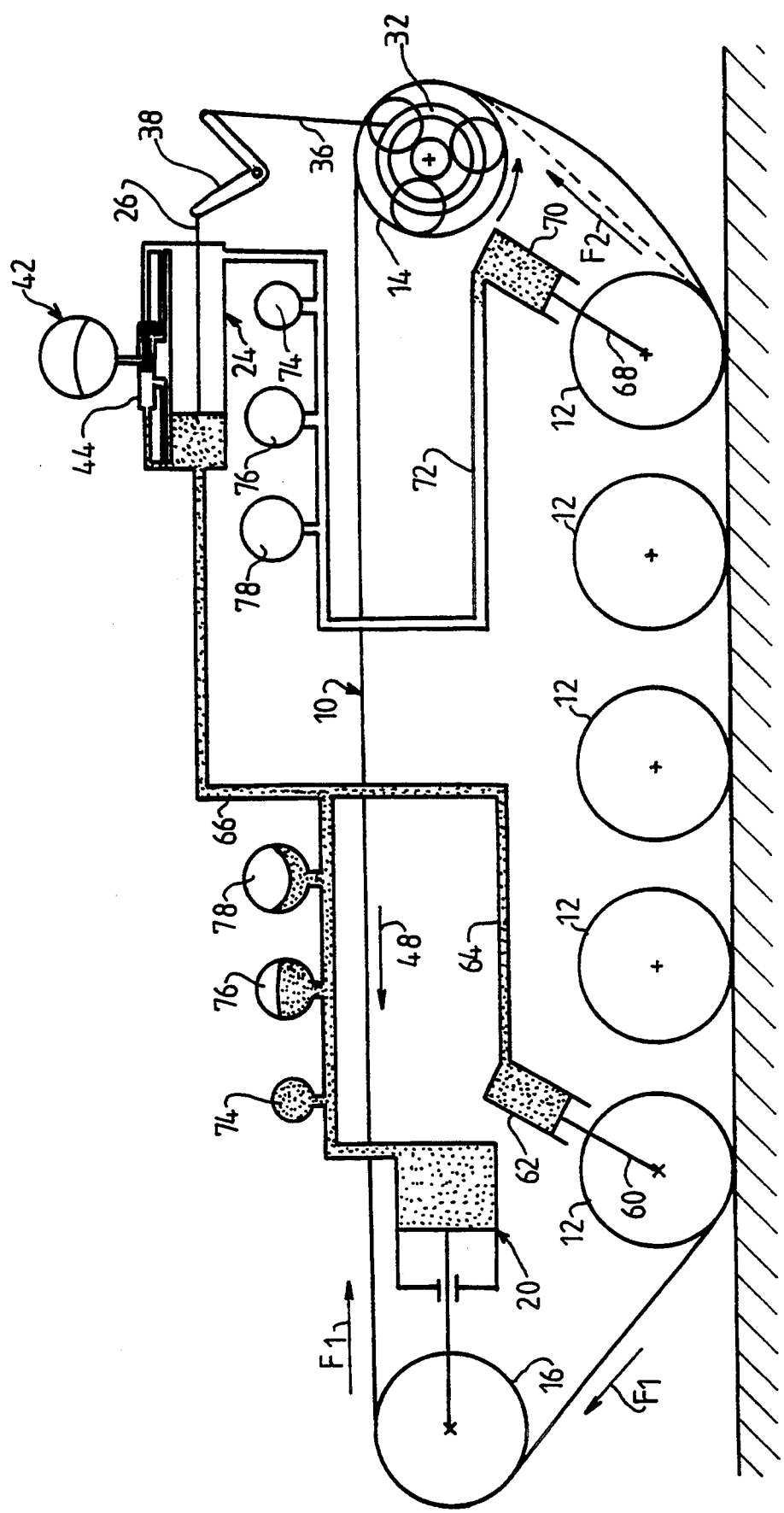
FIG. 2 shows a variant embodiment of the apparatus.

FIG. 2 shows a variant embodiment of apparatus of the invention, enabling the hydrostatic track-tensioning network to be used for automatically compensating the effects that the front length or the rear length being put under tension has on the unloading respectively of the front wheel or of the rear wheel. This variant embodiment uses all the means described above with reference to FIG. 1, and further includes connections between the above-mentioned actuator 24 and single-acting hydraulic actuators associated with the front ground wheel and the rear ground wheel.

In this variant, the axle of the front ground wheel 12 is connected to the piston rod 60 of a single-acting hydraulic actuator 62 whose cylinder is carried by the chassis of the vehicle, the actuator 62 being fed with hydraulic liquid under pressure via a pipe 64 connected to the feed pipe 66 of the actuator 20 of the return pulley. In the same way, the axle of the rear wheel 12 is connected to the piston rod 68 of a single-acting actuator 70 whose cylinder is carried by the chassis of the vehicle, and which is fed with liquid under pressure via a pipe 72 connected to the right end of the cylinder of actuator 24. The actuators 62 and 70 of the front and rear wheels are in parallel with the suspension means associated with those wheels.

Preferably, pressure accumulators are also provided on the feed pipe 66 of the actuator 20 of the return pulley, and on the feed pipe 72 of the actuator 70 of the rear wheel 12, e.g. three pressure accumulators on each pipe 66, 72, the accumulators comprising, for example, an accumulator 74 set to a relatively low pressure value, an accumulator 76 set to a medium pressure value, and an accumulator 78 set to a relatively high pressure value.

In all other respects, this apparatus comprises the same elements as in FIG. 1, designated by the same references.

This apparatus operates as follows: when the vehicle is moving forwards, with the track being driven in the direction indicated by arrow 48, and when the torque applied by the sprocket wheel 14 to the track 10 is braking torque, a relatively large braking force F1 occurs in the leading or front length of the track and in the top length thereof, this braking force tending to push the return pulley 16 backwards and to raise the front wheel while pushing the piston of actuator 62 back inside the cylinder thereof. As indicated above, the small ring 32 of the differential gear train of the sprocket wheel is then driven counter-clockwise and moves the piston of actuator 24 leftwards, thereby increasing both the pressure in the actuator 20 of the return pulley and also the pressure in the actuator 62 of the front wheel 12, as a direct function of the braking torque applied by the sprocket wheel 14 to the track 10, so that the return pulley 16 and the front wheel 12 withstand the force exerted on them by the braking force F1, and keep the track 10 under tension. Simultaneously, accumulator 42 is isolated from the left chamber of actuator 24 and is put in communication with the right chamber thereof, so as to feed the actuator 70 of the rear wheel 12 by means of the pressure in accumulator 42, thereby keeping the rear or trailing length of the track taut.

Under these conditions, if the front wheel 12 is raised by running over an obstacle, the piston of actuator 62 is pushed into the cylinder thereof, thereby feeding hydraulic liquid to the actuator 20 of the return pulley, and moving the return pulley forwards, so as to compensate for the front wheel 12 being raised, and so as to enable the front length of the track to be kept taut. Under the same conditions, if the rear wheel 12 is raised by running over an obstacle, the piston of actuator 70 is pushed into the cylinder thereof, and hydraulic liquid is fed into the right chamber of actuator 24, thereby moving the piston of that actuator leftwards. The leftward movement of the piston enables the sprocket wheel to be rotated so as to take up the slack that has occurred in the rear length of the track as a result of the rear wheel 12 being raised, and so as to transfer said slack forwards. Since the leftward movement of the piston of actuator 24 results in a corresponding forward displacement of the return pulley 16, the forwardly-transferred slack in the track is absorbed by the displacement of the return pulley, and the track is kept under tension.

The pressure accumulators 74, 76, and 78 that are connected to the pipes 66 and 72 make it possible to absorb a portion of the wide dynamic range of pressure variations that result, in particular, from the front and rear wheels running over obstacles at high speed, thereby avoiding the risks of dynamic forces tending to break the mechanical members or the hydraulic liquid pipes.

When the vehicle is moving forwards, and when the sprocket wheel 14 applies acceleration torque to the track 10, a large propulsion force F2 occurs in the rear or trailing length of the track, said propulsion force tending to raise the rear wheel 12. The small ring 32 of the differential gear train of the sprocket wheel is rotated clockwise, thereby moving the piston of actuator 24 rightwards so as to increase the pressure in the actuator 70 of the rear wheel 12, and so as to resist the upward motion of said rear wheel. Pressure accumulator 42 is put in communication with the actuator 20 of the return pulley and with the actuator 62 of the front wheel 16, so as to keep the front or leading length of the track taut.

As in the above-described case, if the front wheel 12 is raised by running over an obstacle, a certain volume of hydraulic liquid is pushed out from actuator 62 and fed into actuator 20 so as to move the return pulley 16 forwards and so as to absorb the slack resulting from the front wheel 12 being raised. When the rear wheel 12 is raised by running over an obstacle, a volume of hydraulic liquid is pushed out from the actuator 70 of the rear wheel and fed into the right chamber of actuator 24, thereby moving the piston of that actuator leftwards, and making it possible to rotate the sprocket wheel so as to transfer forwards the resulting slack that occurs in the rear length of the track. The leftward movement of the piston of actuator 24 causes hydraulic liquid to be fed into actuator 20, thereby moving the pulley 16 forwards so as to absorb the slack in the track that is transferred forwards by the sprocket wheel 14.

By way of indication, in a particular embodiment in which the pressure in accumulator 42 is about ten bars under conditions of full expansion, the inflation pressures of accumulators 74, 76, and 78 may be respectively about twenty bars, about fifty bars and about one hundred and fifty bars.

It is clear from the above that, passively and without consuming very much energy, the apparatus of the invention makes it possible to maintain a tension having a predetermined minimum value in the tracks of a vehicle such as a tank, thereby avoiding the risks of the track riding over or coming off while the tank is in motion. Nevertheless, it may be useful to add certain specific means to the apparatus. These means are described below with reference to FIGS. 3 and 4, and they enable, in particular, the behavior of the tank to be improved in certain specific situations.

Figure 3:
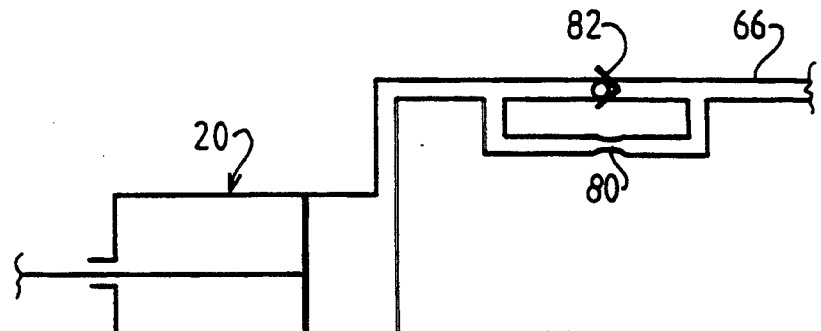
FIGS. 3 and 4 are fragmentary diagrammatic views showing variant embodiments of certain portions of the apparatus.

In FIG. 3, non-linear damper means are provided at the outlet of the actuator 20 of the return pulley, said means comprising a constriction 80 in parallel with a non-return valve 82 that allows liquid to pass towards the actuator 20 and prevents liquid from passing in the opposite direction.

The non-linear damper means at the outlet of the actuator 20 of the return pulley are useful when the vehicle is passing quickly over an obstacle which hits the leading length of the track at a relatively high speed. In this case, the leading length may be distorted backwards by being pressed against the obstacle, resulting in the front wheel 12 hitting the obstacle, because the pressure in the actuator 20 of the return pulley is too low to withstand the backward force that is exerted on the pulley by the leading length of the track. The damper means 80, 82 provided at the outlet of actuator 20 make it possible to brake the backward motion of the return pulley 16, in such a case, and therefore to maintain the leading length of the track relatively taut, thereby making it easier for the front wheel 12 to ride up over the obstacle.

Figure 4:
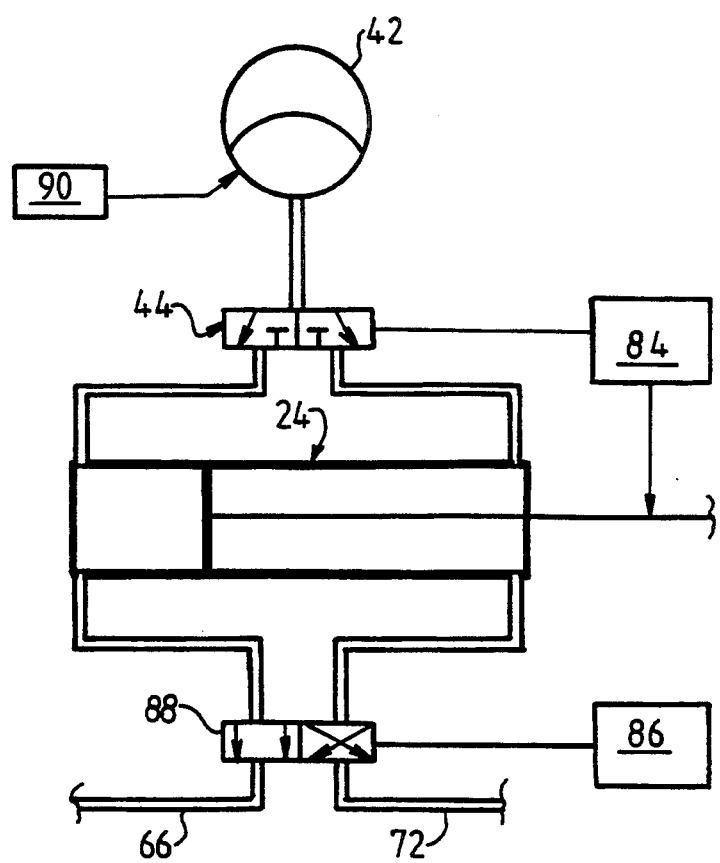

In FIG. 4, the apparatus of the invention is further provided with means including, in particular, a control circuit 84 for controlling the bistable valve associated with pressure accumulator 42 and with actuator 24, and a control circuit 86 for inverting the outlets of actuator 24.

In the above-described embodiments, the bistable valve 44 was operated merely by the leftward or rightward displacement of the piston of actuator 24. The control circuit 84 provided in the variant embodiment shown in FIG. 4 also takes into account the position of actuator 24 so as to allow valve 44 to change state only when the piston of actuator 24 is in an intermediate or middle portion of its stroke, i.e. when it is situated at a certain distance from the ends of the cylinder of the actuator. For example, the stroke of the piston in actuator 24 may be divided into three equal portions, and the valve 44 may be allowed to change state only when the piston is in the middle third of its stroke. In this way, the piston is not brought to a position in which it abuts against one end of the cylinder while the apparatus is operating, which would decrease the effectiveness of the apparatus.

The control circuit 86 controlling an inversion valve 88 connecting the outlets of actuator 84 respectively to pipes 66 and 72 is preferably controlled by the driver of the vehicle, and it can be used essentially when the vehicle is running slowly over a relatively high obstacle. In this situation, so that the obstacle pressing against the return pulley 16 does not cause said pulley to be moved backwards, thereby giving rise to slack in the track as a whole, the driver may invert the outlets of actuator 24 by means of circuit 86 and of valve 88, thereby connecting the left chamber of that actuator to the feed pipe 72 of the actuator 70 of the rear wheel 12, and connecting the right chamber of actuator 24 to the actuator 20 of the return pulley and to the actuator 62 of the front wheel 12.

Under such conditions, the propulsion torque transmitted by the sprocket wheel 14 to the track 10 causes a corresponding increase in pressure both in the actuator 20 of the return pulley 16 and in the actuator 62 of the front wheel 12, thereby increasing the tension in the leading length of the track and making it easier for the return pulley 16 and the front wheel 12 to ride up over the obstacle.

Another solution that may be used in this particular case consists in providing a shut-off valve on the outlet of actuator 20 of on pipe 66.

Advantageously, as shown in FIG. 4, means 90, e.g. controlled by the driver, may be provided for increasing or decreasing the pressure in accumulator 42. Such means enable the minimum track tension to be adjusted, e.g. so as to increase it when the vehicle is travelling over relatively soft or weak terrain. In which case, the higher tension of the carrying length of the track enables the forces to be better distributed on the ground, thereby making it easier for the vehicle to move.

I claim:

1. Hydrostatic apparatus for tensioning a track on a vehicle, in particular an armored vehicle such as a tank, on which the track is guided over ground wheels, over a drive member such as a sprocket wheel, and over a return pulley whose spindle is associated with a pulley-displacing hydraulic actuator enabling the tension of the track to be adjusted, said apparatus including feed means for feeding the actuator of the return pulley with hydraulic liquid at a pressure which corresponds to a minimum desired value for the tension of the track when the sprocket wheel transmits acceleration torque to the track, and which is increased by an amount that is a function of the torque transmitted by the sprocket wheel to the track when the torque is braking torque, the feed means comprising firstly static pressure-maintaining means for maintaining a minimum pressure in the actuator of the return pulley, and secondly a second hydraulic actuator controlled by mechanical means for transmitting the torque applied by the sprocket wheel to the track.

2. Apparatus according to claim 1, wherein the sprocket wheel is connected to a drive shaft via a planetary-type differential gear train in which a member that is normally prevented from rotating, e.g. such as the planet carrier, is mounted so as to be free to rotate about the axis of the sprocket wheel and is connected via a linkage to the piston of the second hydraulic actuator so as to transmit a force thereto whose direction and amplitude are functions of the direction and amplitude of the torque applied by the sprocket wheel to the track.

3. Apparatus according to claim 1, wherein the pressure-maintaining means comprise a pressure accumulator connected to the actuator of the return pulley via a bistable valve which is connected in parallel with the second actuator, and which is controlled by the displacement of the piston in the second actuator.

4. Apparatus according to claim 3, including a control circuit for controlling the bistable valve so as to allow said bistable valve to change state only when the piston of the second actuator is in a predetermined middle portion of its stroke.

5. Apparatus according to claim 1, wherein the axles of the front and rear end ground wheels are connected to the chassis of the vehicle via single-acting hydraulic actuators fed via a second hydraulic actuator, the single-acting actuator of the end wheel that is situated in the vicinity of the return pulley and the actuator of said return pulley being fed via the same chamber of the second actuator, the single-acting actuator of the end wheel that is situated in the vicinity of the sprocket wheel being fed via the other chamber of the second actuator.

6. Apparatus according to claim 1, including pressure-adjusting means for setting the pressure to a value corresponding to the minimum desired tension for the track.

7. Apparatus according to claim 1, including damping or braking means for damping or braking the backward stroke of the return pulley, which means are provided in the outlet pipe of the actuator of the pulley.

8. Apparatus according to claim 1, including inversion means for inverting the connection between the actuator of the return pulley and the second actuator.

9. Apparatus according to claim 1, including pressure surge absorption means for absorbing a wide dynamic range of pressures, which means comprise pressure accumulators mounted on the outlets of the second actuator.

* * * * *